US006760487B1

(12) United States Patent
Linares

(10) Patent No.: US 6,760,487 B1
(45) Date of Patent: Jul. 6, 2004

(54) ESTIMATED SPECTRUM ADAPTIVE POSTFILTER AND THE ITERATIVE PREPOST FILTERING ALGIRIGHMS

(75) Inventor: Irving Linares, Columbia, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/550,254

(22) Filed: Apr. 14, 2000

Related U.S. Application Data

(60) Provisional application No. 60/130,475, filed on Apr. 22, 1999.

(51) Int. Cl.[7] .............................. G06K 9/40; H04N 7/12
(52) U.S. Cl. ................................... 382/275; 375/240.02
(58) Field of Search .............................. 382/261, 263, 382/266, 275; 341/67, 87, 94; 348/394, 610, 618; 375/240.02, 240.03, 240.24; 378/4; 704/200.1; 708/203

(56) References Cited

U.S. PATENT DOCUMENTS

| | | | | |
|---|---|---|---|---|
| 5,786,857 A | * | 7/1998 | Yamaguchi | 375/240.03 |
| 5,850,484 A | * | 12/1998 | Beretta et al. | 382/250 |
| 5,883,979 A | * | 3/1999 | Beretta et al. | 382/251 |
| 5,937,098 A | * | 8/1999 | Abe | 382/239 |
| 6,501,858 B1 | * | 12/2002 | Terane | 382/239 |

OTHER PUBLICATIONS

Linares, I., et al., "Enhancement of block transform coded images using residual spectra adaptive postfiltering", Conference on Data Compression, Mar. 31, 1994.*

Su, J.K. et al., "Post–processing for artifact reduction in Jpeg–compressed images", 1995 International Conference on Acoustic Speech, and Signal Processing, May 1995.*

Chou, M. et al., A Simple Algorithm for Removing Blocking Artifacts in Block–Transform Coded Images, IEEE Signal Processin Letters, vol. 5, No. 2, Feb. 1998.*

"Theory and Applications of the Estimated Spectrum Adaptive Post–filter", Ph.D. thesis, Georgia Institute of Technology. ,, 1998 Irving Linares, pp. 1–113 May, 1998.

JPEG image–adaptive DCT coefficient quantization software "adaptQ()" as described and made available by M. Crouse and K. Ramchandran, "Joint Thresholding and Quantizer Selection for Transform Image Coding: Entropy–Constrained Analysis and Applications to Baseline JPEG," IEEE Transactions on Image Processing, vol. 6, No. 2, pp. 205–297, Feb. 1997.

* cited by examiner

*Primary Examiner*—Mehrdad Dastouri
*Assistant Examiner*—Martin Miller

(57) ABSTRACT

The invention presents The Estimated Spectrum Adaptive Postfilter (ESAP) and the Iterative Prepost Filter (IPF) algorithms. These algorithms model a number of image-adaptive post-filtering and pre-post filtering methods. They are designed to minimize Discrete Cosine Transform (DCT) blocking distortion caused when images are highly compressed with the Joint Photographic Expert Group (JPEG) standard. The ESAP and the IPF techniques of the present invention minimize the mean square error (MSE) to improve the objective and subjective quality of low-bit-rate JPEG gray-scale images while simultaneously enhancing perceptual visual quality with respect to baseline JPEG images.

10 Claims, 8 Drawing Sheets

FIG. 3(a)
64 x 64 NIVF
FIG. 3(b) 512 x 512 IVF
FIG. 3(c)
64 x 64 NIHF
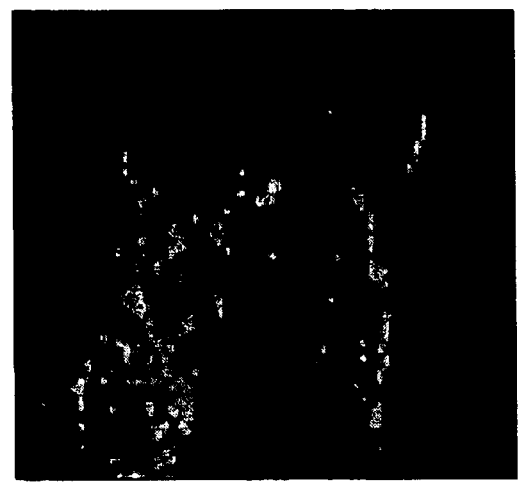
FIG. 3(d) 512 x 512 IHF FIG. 5(a)
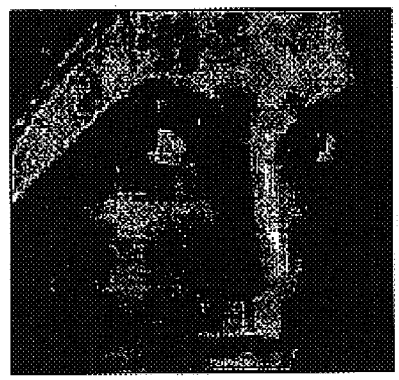
JPEG Lena @ 0.25 BPP, 31.68 dB
FIG. 5(b)
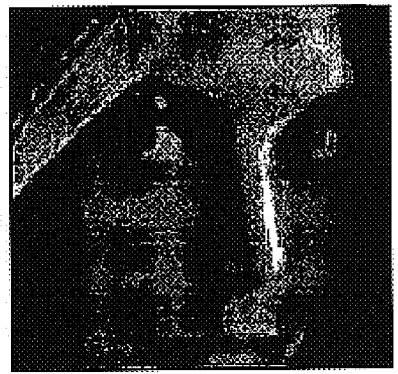
AQ-ESAP Lena @ 0.25 BPP, 33.01 dB
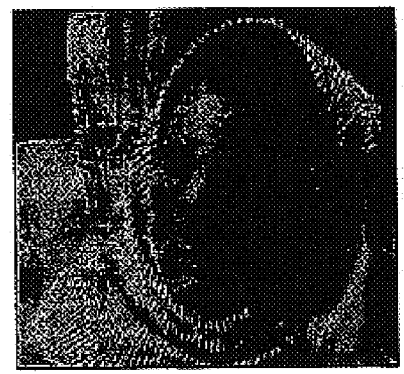
JPEG Barbara @ 0.5 BPP, 28.27 dB
FIG. 5(c)
JO-ESAP Barbara @ 0.5 BPP, 31.23 dB
FIG. 5(d)

FIG. 7(a)
Original image x
FIG. 7(b)
Preemphasized image $x_e$
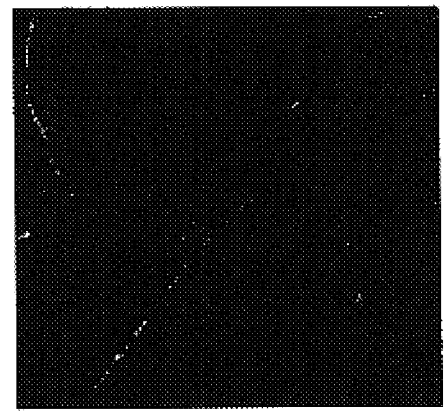
FIG. 7(c)
DRC image $x_r$

FIG. 7(d)
Decoded DRC image $\hat{x}_r$
FIG. 7(e)
DRE image $\hat{x}_e$
FIG. 7(f)
Deemphasized image $\hat{x}$
FIG. 7(g)
JPEG-IPF-ESAP image $\tilde{x}$

ESTIMATED SPECTRUM ADAPTIVE POSTFILTER AND THE ITERATIVE PREPOST FILTERING ALGIRIGHMS

This application claims the benefit of Provisional Application No. 60/130,475, filed Apr. 22, 1999.

ORIGIN OF THE INVENTION

The invention described herein was made by employee of the United States Government. The invention may be manufactured and used by or for the governmental purposes without the payment of royalties thereon or therefor.

BACKGROUND OF THE INVENTION

The present invention relates generally to image processing, and particularly to image enhancement following JPEG image compression and decompression. Prior methods for enhancing compressed images are beset with disadvantages or limitations. To achieve acceptable compression rates, the JPEG standard adopted a lossy compression technique. Furthermore, the JPEG, MPEG, H.261 and HDITV image and video coding algorithms are severely impaired by blocking artifacts when operating at low bit rates. A compressed image becomes distorted when compressed by lossy methods. Distortion in the image can be confined to hidden areas of the image by carefully implementing the JPEG standard and several enhancement methods for reducing the distortion have been attempted. However, in some regions of the image these prior methods may further degrade the image. Prior methods for reducing distortion introduced by the JPEG compression algorithm can introduce a high-frequency artifact around high contrast edges. Algorithms for removing artifacts exist, but can mistakenly remove thin lines and smooth over important texture. Errors also arise between adjacent 8×8 pixel image blocks created by opposite-signed round-off errors in the two blocks. One way to remove these errors is to filter the image using a low-pass filter. However, other image regions that contain important high frequency information may suffer a loss in fidelity. Likewise, many other post-processing algorithms are most effective when they are selectively applied only to certain regions of an image. Previous techniques are mainly non-linear filtering methods based on local pixel statistics rather than on local frequency content. Prior efforts include; JPEG Cross Block Smoothing (CBS), Projection Onto Complex Sets (POCS), and a variety of nonlinear filters. These offer lower peak signal to noise ratio (PSNR) and lower subjective quality than the improved algorithms proposed in the present invention, however. Additional background information may be found in the following literature references:

IJG JPEG Software 0 1990–95, Tom G. Lane.

Canny Edge Detector from "X-based Image Processing Tools and Environment (XITE)", S. Boe, 1994.

JPEG image-adaptive DCT coefficient quantization software "adaptQ( )" as described and made available by M. Crouse and K. Ramchandran, "Joint Thresholding and Quantizer Selection for Transform Image Coding: Entropy-Constrained Analysis and Applications to Baseline JPEG," IEEE Transactions on Image Processing, vol. 6, No. 2. pp. 205–297, February 1997.

"Theory and Applications of the Estimated Spectrum Adaptive Post-filter", Ph.D. thesis, *Georgia Institute of Technology*. © 1998 *Irving Linares*, Pages 1–113 May, 1998.

SUMMARY OF THE INVENTION

ESAP and IPF algorithms of the present invention significantly reduce the blocking artifacts resulting from high compression by reusing the DCT coefficient local frequency characteristics to control a pixel-adaptive non-linear post-filter or a pre-post filtering system. This allows more compression and better quality compression when compared with the default JPEG compression parameters. These algorithms provide a new frequency-based pixel-adaptive filtering algorithm which may be used to enhance de-compressed JPEG images and to enhance MPEG sequences for Internet or HDTV video applications.

One object of the present invention is to reduce blocking artifacts in low-bit-rate JPEG images, particularly in systems wherein image pixels are coded using bit to pixel ratios less than or equal to 0.25 bits per pixel.

Another object is to improve PSNR and perceptual quality of coded images simultaneously and to demonstrate the feasibility of extending still image pre- and post-processing concepts to MPEG and HDTV standards.

A further object is to suggest use of ESAP/IPF algorithms to improve very low rate MPEG video sequences such as those processed by popular 28.8 k–56 k modems generally used with web browser streaming video viewers such as RealPlayer™ or Streamworks, for example.

ESAP relies on DFT analysis of the DCT and is compliant with the coded stream syntax of the Independent JPEG Group (IJG) Version 5b Software. At the decoder, ESAP estimates the 2-D pixel-adaptive bandwidths directly from the dequantized DCT coefficient. These coefficients are used to control a 2-D spatially adaptive non-linear post-filter. The algorithm optionally performs directional filtering parallel to the edges with no filtering across the edges. Post-filtering images show minimal blurring of their true edges while blocking is significantly removed.

IPF is based on the concepts of dbx audio noise reduction. IPF is a pre-post filtering system that uses inverse pair 2D filters for high frequency pre-emphasis before encoding and high frequency de-emphasis after decoding. Convergence to a unique minimum mean square error (MMSE) is possible for fixed quantization matrices. However, convergence can not be guaranteed when image-adaptive DCT quantization is jointly optimized under pre-post filtering.

The ESAP methods of the present invention have been successfully applied to JPEG color images, synthetic aperture radar (SAR) images, and image sequences. Typical PSNR improvement depends on the image, the encoding method, and the bit rate. For 512×512 8-BPP gray-scale images improvement in the range between 0.5–3.2 dB over baseline JPEG has been observed. Adaptive quantization has been observed to improve 5.6 dB for 1008×1008 8-BPS SAR images at 4-BPP over baseline JPEG. A comparison of all the treated techniques is presented at the conclusion of thesis document (*Irving Linares, Theory and Applications of the Estimated Spectrum Adaptive Post-filter, Georgia Institute of Technology*. © 1998 *Irving Linares*, Pages 1–113 May, 1998) incorporated herein by reference. ESAP and IPF algorithms of the present invention significantly reduce blocking artifacts resulting from high compression by reusing the DCT coefficient local frequency characteristics to control a pixel-adaptive non-linear post-filter or a pre-post filtering system. This allows more compression and/or better quality compression when compared with the default JPEG compression parameters alone. The subjective quality of image improvement is more clearly shown by means of foregoing software-simulated results—including several image samples. The ESAP and IPF algorithms may also improve the visual quality of DCT coded images, such as JPEG images and may be extended to MPEG video sequences, since MPEG is largely a DOT coder.

BRIEF DESCRIPTION OF THE DRAWINGS

FIG. 3(a) is a non-interpolated vertical frequency (NIVF) image.

FIG. 3(b) is an interpolated vertical frequency (IVF) image.

FIG. 3(c) is the non-interpolated horizontal frequency (NIHF) image.

FIG. 3(d) is an interpolated vertical frequency (IVF) image.

FIG. 5(a) shows a baseline JPEG image of Lena at 0.25 BPP.

FIG. 5(b) is Lena showing her corresponding adaptive quantization (AQ-ESAP) image at 33.01 dB PSNR.

FIG. 5(c) is a baseline JPEG Barbara image at 0.5 BPP, 28.27 dB PSNR.

FIG. 5(d) is Barbara showing jointly optimized (JO-ESAP) version at 31.23 dB PSNR.

FIG. 7(a) shows an original 8-BPP Lena image x at IPF encoder.

FIG. 7(b) is a preemphasized 8-BPP Lena image $x_e$ at IPF encoder.

FIG. 7(c) is a DRC 8-BPP Lena image $x_r$ at IPF encoder.

FIG. 7(d) is a decoded DRC 8-BPP Lena image $x_r$ at IPF encoder.

FIG. 7(e) is a DRE 8-BPP Lena image $x_e$ at IPF encoder.

FIG. 7(f) is a Deemphasized 8-BPP Lena image x at IPF encoder.

FIG. 7(g) is a JPEG-IPF-ESAP 8-BPP Lena image x at IPF encoder.

Tables 2(a), (b), (c), and (d) summarize the decibel (dB) PSNR comparative results.

Tables 3(a) and (b) show the IPF results for the 512×512 8-BPP Lena image.

Tables 3(c) and (d) show the results for the 512×512 Barbara image.

DETAILED DESCRIPTION OF THE PREFERRED EMBODIMENT

Figure 1:
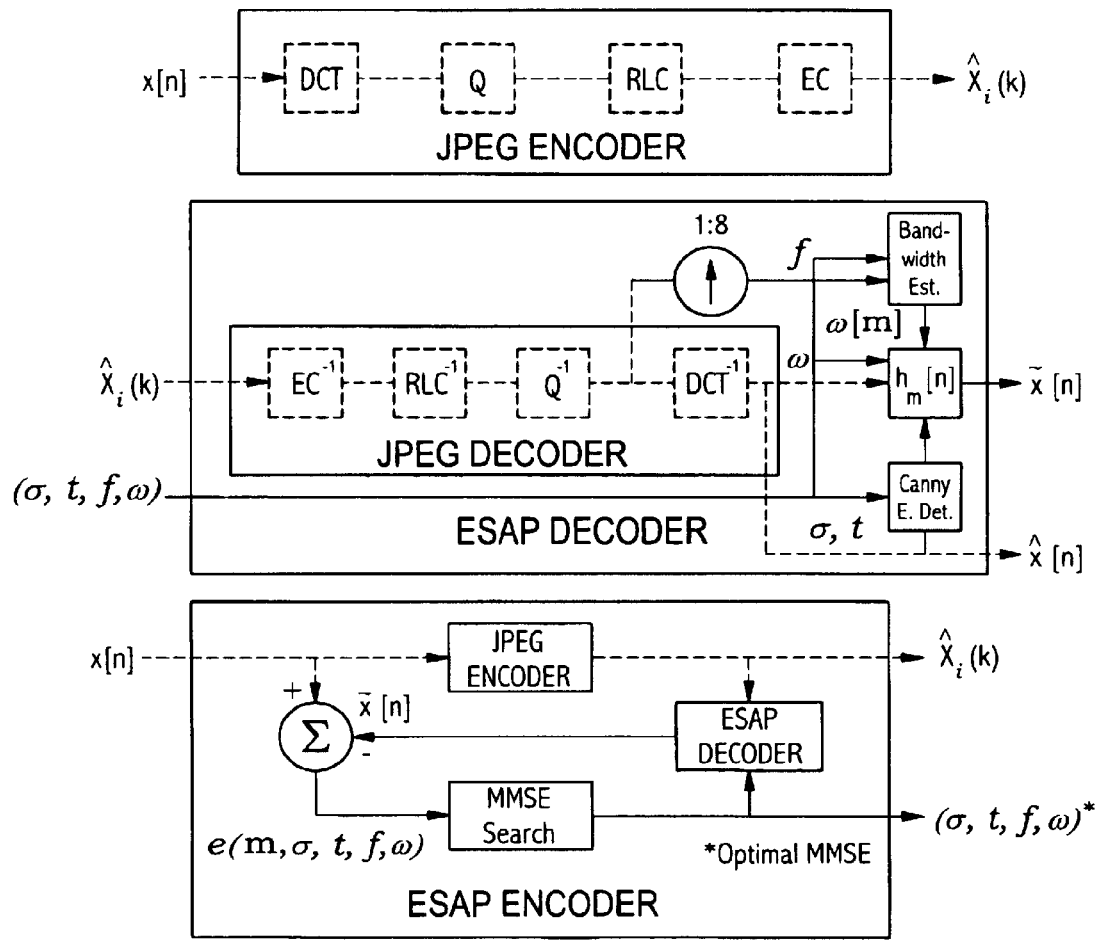
FIG. 1 is a block representation of the ESAP algorithm—which includes or employs a JPEG digital image compression-decompression system.

Referring now to FIG. 1, ESAP Encoder is an acronym for Estimated Spectrum Adaptive Post-filter (ESAP) Encoder. The main components of the ESAP algorithm are shown including a JPEG Encoder and a JPEG Decoder. Each of these coders includes standard Independent JPEG Group (IJG) Version 5b Software. From the JPEG decoder, we obtain the decoded DCT coefficients used to estimate each pixel's local bandwidth. This process uses 1:8 spatial interpolation as will be more fully explained in sections that follow. The ESAP algorithm iteratively searches for the minimum mean square error (MMSE) of the error signal e(m, σ,t,f,w), where m are the 2-D pixel coordinates. The m coordinates are omitted for clarity in the foregoing discussion. Local pixel bandwidth is used to adaptively post-filter the decoded image. The MMSE search algorithm searches a 4-D error surface e(σ,t,f,w) to obtain an optimal 4-tuple with parameters σ,t,f and w as shown in FIG. 1.

The parameters are:
- σ=Canny edge detector's Gaussian standard deviation sigma parameter (usually in the range [0.5 ... 2.5]). This controls the region of support of the edge detector.
- t=Canny edge detector's edge strength threshold, [0 ... 255] range.
- f=Magnitude of ESAP's DCT frequency bandwidth, [0.0 ... √2π] range. In conjunction with t, this classifies pixels into the three categories: EDGE, NON-EDGE, or TEXTURE.
- w=directional filter region of support (w×w) in pixels, w=[2 ... 16]. Non-directional filters have a fixed order of 17×17 pixels to cover four contiguous 8×8 DCT blocks.

Each iteration requires compression, decompression and bandwidth estimation.

Estimated Spectrum Adaptive Post-filter

FIG. 1 shows the ESAP algorithm extension to the baseline JPEG coder. In the block diagram of FIG. 1, x[n] is the gray-scale input image, $X\hat{}_j(k)$ are the DCT coefficients of the transformed image, x^[n] is the decoded JPEG image and x[n], is the post-filtered image.

The meaning of error signal e(σ,f,t,w) was explained earlier [as e(σ,t,f,w)] and will not be repeated here.

To obtain better visual quality and a lower MSE, ESAP uses image-adaptive DCT quantization tables or Q-tables. This is not strictly necessary, but can improve PSNR about 1–2 dB without increasing the bit rate. In post-processing, ESAP estimates 2-D pixel adaptive bandwidths directly from the dequantized DCT coefficients—without incurring any additional side information. Post-processing usually provides an additional 1 dB improvement. The ESAP algorithm combines pixel-adaptive bandwidths with directional Canny edge detectors to control a 2-D spatially-adaptive non-linear post-filter $h_m[n]$ to significantly reduce DCT blocking artifacts. Overhead required to transmit the MMSE post-filter parameters amounts to only two to four bytes. Results of our experiments outlined in the pages, tables and image samples ahead show ESAP improved PSNR up to 3.23 dB over baseline JPEG while yielding subjective improvement as well.

ESAP takes into consideration the Human Visual System (HVS) spatial frequency masking characteristics. Based on the HVS tolerance to quantization errors in the high-frequency regions, ESAP performs directional filtering parallel to edges with little or no filtering across edges. Low-frequency non-edge regions are post-filtered with separable non-directional adaptive low-pass filters to minimize blocking and restore some of the image's natural smoothness. The edges are post-filtered with non-separable directional low-pass filters. The filter's directionality helps to reduce blocking along the local edge without significantly reducing perceived fidelity across the edge, where high-frequency quantization discontinuity errors are otherwise masked by the HVS perception of the edge itself.

Fourier Transform Analysis of the DCT Basis Functions

Each DCT basis function has a Fourier transform whose waveform can be explained by the modulation theorem. In the 1-D case, this takes the form $$x[n]w[n] \overset{F}{\Leftrightarrow} 1/(2\pi)X(\omega)*W(\omega) \qquad \text{Equation (7)}$$

Figure 2:
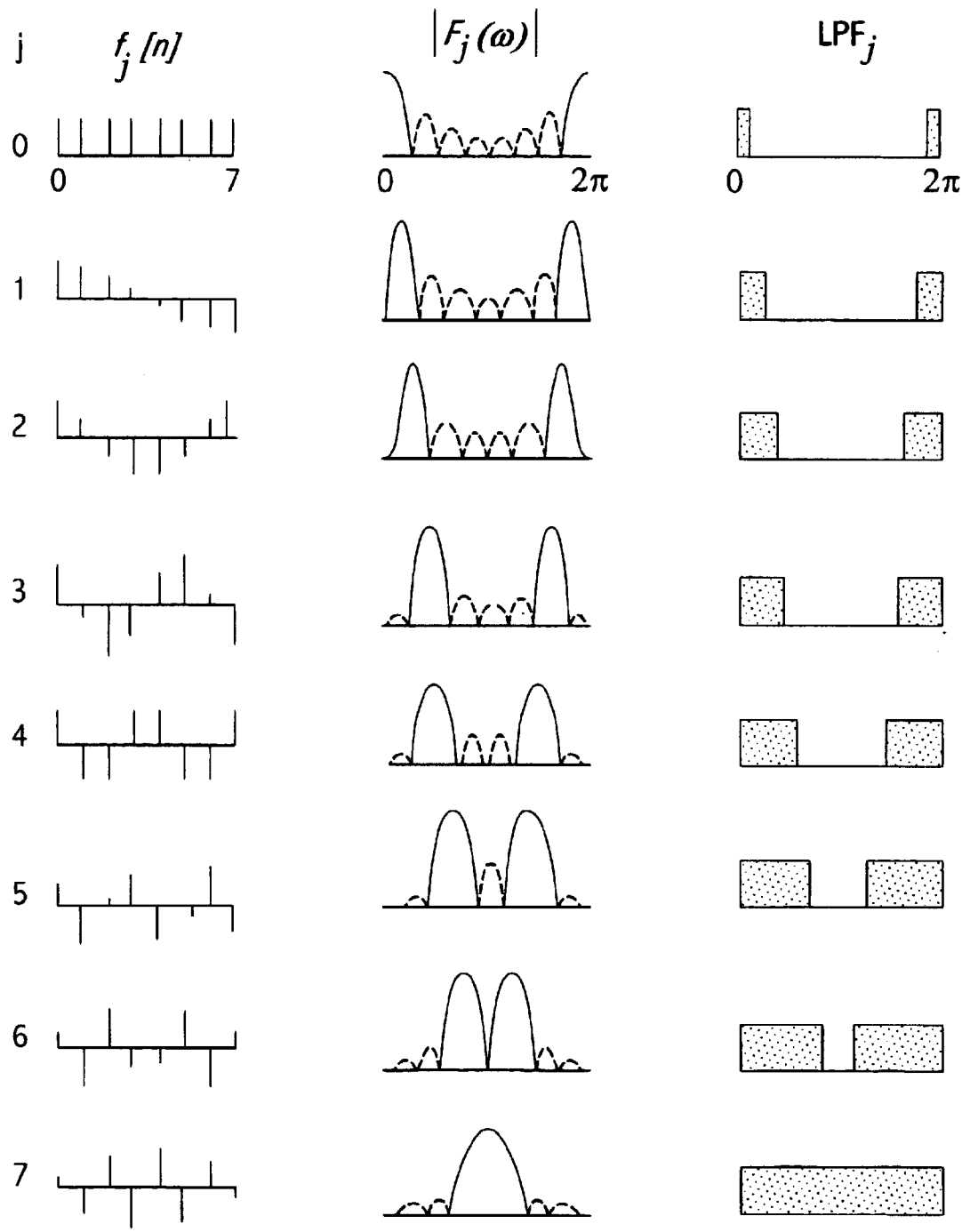
FIG. 2 is a Table comparing waveforms: DCT basis functions $f_j[n]$, Fourier transforms $|F_j(\omega)|$, & ideal Low-Pass Filter forms $LPF_j$, respectively.

Referring to FIG. 2, note that multiplication of a cosine function $f_j[n]$ by an eight-point rectangular window w[n] in the time domain is equivalent to the circular convolution '*' of a sine-shaped rectangular window transform W(ω) with an ideal pair of impulses $\pi\delta(\omega\pm\omega_j)$ resulting in the $|F_j(\omega)|$ waveforms shown. Analysis of the discrete-time Fourier transform of each of the DCT basis functions, in conjunction with FIG. 2, indicates that the ripples or side lobes of the spectrum of each DCT basis function, shown as dashed lines, are the frequency representation of the DCT blocking at any particular spatial frequency. The window's width determines the main lobe frequency resolution and simultaneously introduces ripples.

The ripples represent the out-of-band DCT blocking, while the main lobes contain the dominant in-band signal. If we neglect aliasing, then reduction of the DCT blocking is obtained by low-pass filtering the out-of-band side-lobes starting at a cutoff frequency W, determined by the highest-frequency nonzero DCT coefficient. This analysis is readily extensible to the 2-D case using a separable DCT. FIG. 2 further shows the ideal low-pass filters $LPF_j$ associated with each DCT basis function. Table 1 below lists their cutoff frequencies.

TABLE 1

Coefficient-block bandwidth relationship

| Highest DCT Coeff. Present | Normalized I-D Bandwidth $\omega_c$ |
|---|---|
| $C_0$ | 0.125π |
| $C_1$ | 0.250π |
| $C_2$ | 0.375π |
| $C_3$ | 0.500π |
| $C_4$ | 0.625π |
| $C_5$ | 0.750π |
| $C_6$ | 0.875π |
| $C_7$ | 1.0π |

Using Table 1, each block's bandwidth is found by inspecting the highest 2-D nonzero coefficient. Intermediate zero coefficients are neglected since they do not determine the block's bandwidth. For example, if the block's highest coefficient is $C_{25}$, then the vertical bandwidth is 0.375 π and the horizontal bandwidth is 0.750 π. The 2-D local bandwidth is centered in the middle of the block for interpolation purposes. This analysis generates two images each having a 64×64 pixel bandwidth from a 512×512 pixel image. These are the non-interpolated vertical frequency (NIVF) image [FIG. 3(a)] and the non-interpolated horizontal frequency (NIHF) image [FIG. 3(c)]. In each of these, the gray level is proportional to the local horizontal or vertical bandwidth. Each NIF is subsequently 1:8 interpolated to obtain two 512×512 interpolated frequency (IF) images. FIGS. 3(b) and (d) show the interpolated vertical frequency (IVF) and the interpolated horizontal frequency (IHF), respectively. To properly filter the image boundaries, we symmetrically extend or replicate the IF images ω(m) and the decoded image x^[n]. This extends the decoded image by one 8×8 block on each side. For example, a 512×512 pixel image increases to 528×528 pixels and the NIF images increase from 64×64 to 66×66 pixels. After the adaptive convolution is performed, the symmetrically extended blocks and NIF images serve no additional purpose and are cleared.

Non-directional Filtering

ESAP smoothes the current pixel of the decoded image x^[$m_1,m_2$] with a 2-D adaptive cutoff low-pass FIR Hamming filter $h_{m1,m2}[n_1,n_2]$ which may be directional or non-directional. The filter's directionality is determined from the output of a Canny edge detector applied to the decoded image. Horizontal and vertical bandwidths are obtained from the IHF and IVF images, respectively. EDGE and NON-EDGE pixels are found by the following rule:

/* Classify EDGE & NON-EDGE pixels */ for (n1=0; n1<N; n1++)
    for (n2=0; n2<N; n2++)
      if (canny_mag[n1][n2]>T &&
        sqrt(Bw1[n1][n2]*Bw1[n1][n21+Bw2[n1][n21*Bw2[n1][n2])>F)
        edge[n1][n21=TRUE;
      else
        edge[n1][n2=FALSE;

wherein:

T is a Canny edge magnitude threshold, F is a normalized 2-D frequency magnitude threshold, and Bw are IFs. In other words, if a pixel is an EDGE pixel in both the spatial domain and the frequency domain, then the pixel is declared a true image EDGE pixel and it is directionally post-filtered. If a pixel's Canny magnitude is <T but its 2-D bandwidth magnitude is >F, then it is declared a TEXTURE pixel and filtered with an impulse δ[n1,n2]. Otherwise, the pixel is declared a NON-EDGE pixel and is subsequently post-filtered non-directionally.

In FIG. 1, we use the equivalent notation t,f, and ω[m] for T,F, and Bw respectively.

Parameters σ and w were explained earlier.

Directional Filtering

Figure 4:
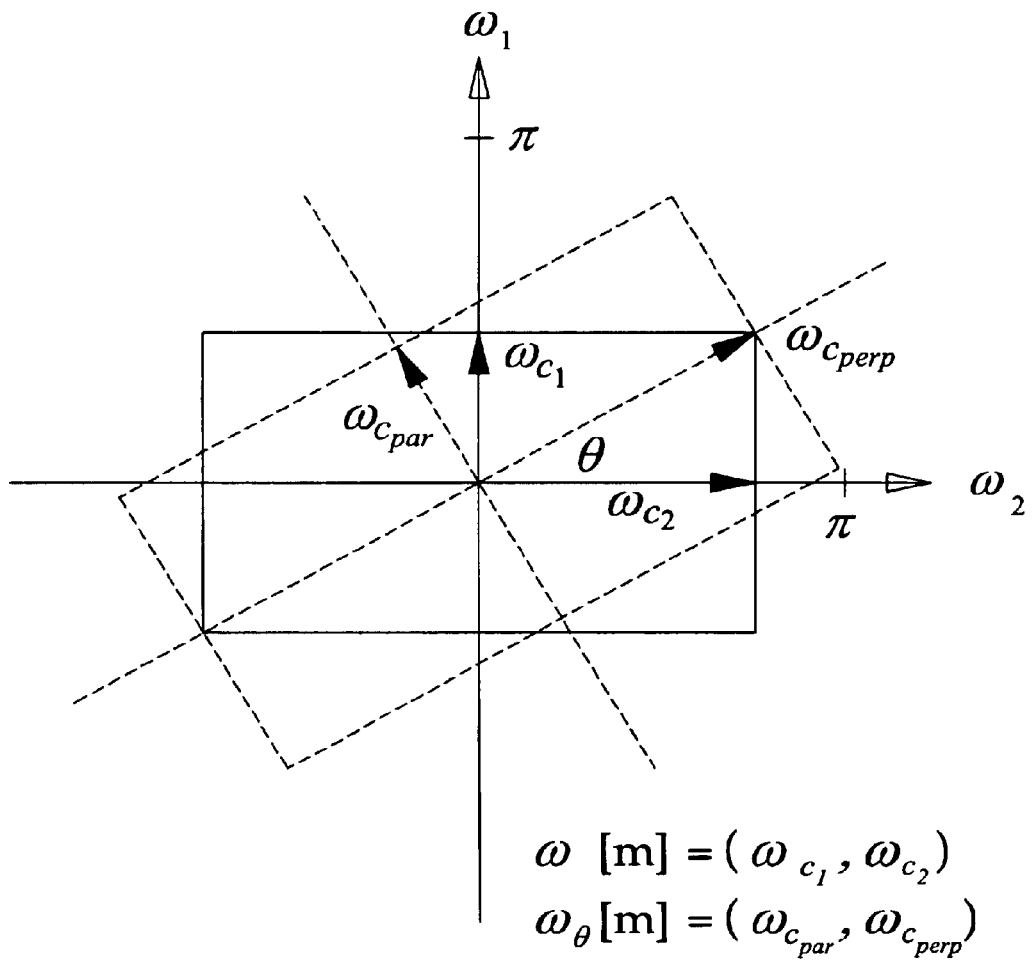
FIG. 4 describes a typical block with substantial diagonal frequencies for the determination of rotated bandwidths $\omega_\theta[m]$.

Once the angular orientation θ of an edge passing through a pixel x^[m] are determined using the Canny edge detector, we compute a rotated bandwidth $\omega_\theta[m]$ from the original rectangular bandwidth estimation ω[m]. FIG. 4, describes a typical block with a substantial quantity of diagonal frequencies. The magnitude of the highest 2-D frequency in the frequency plane corresponds to the perpendicular cutoff frequency across the edge and is given by $$\omega_{c\ perp} \approx \min(1.0, \sqrt{\omega_{c1}^2+\omega_{c2}^2})\pi \qquad \text{Equation (2)}$$

To exploit the HVS high-frequency masking characteristics, we fix $\omega_{c\ perp}=\pi$. The cutoff frequency parallel to the edge is approximately the lower of the vertical $\omega_{c1}$ or horizontal $\omega_{c2}$ DCT bandwidths:

$$\omega_{c\ par} \approx \min(\omega_{c1},\omega_{c2})\pi \qquad \text{Equation (3)}$$

Now, a non-causal 2-D rotated Hamming filter can be expressed as $$h_\theta[\omega_{c\ par}, \omega_{c\ perp}, n_1, n_2] =$$

$$h_{\omega c\ par}[\sqrt{n_1^2+n^2}\sin(\theta+\tan^{-1}(n1/n2))] *$$

$$h_{\omega c\ par}[\sqrt{n_1^2+n^2}\cos(\theta+\tan^{-1}(n1/n2))] \qquad \text{Equation (4)}$$

where θ is measured counterclockwise with respect to the horizontal axis $n_2$ (or ($\omega_2$)) and the 1-D Hamming window LPF is given by:

$$h_{\omega c}[n] = [\sin(\omega_c n)/(\pi n)][0.54-0.46\cos(2\pi n/M)],$$
$$0 \leq n \leq M. \qquad \text{Equation (5)}$$

For NON-EDGE pixels, the above expression simplifies to separable filter $$h[\omega_{c1}, \omega_{c2}, n_1, n_2] = h_{\omega c1}[n_1] h_{\omega c2}[n_2].$$ Equation (6)

Non-directional 1-D filters of Equation (6) are pre-computed at program initialization and accessed as a lookup table during execution. ESAP's computational complexity is approximately $0((MN)^2)$ multiplications and additions for the estimated frequency interpolation and $0((MN)^2)$ additions, $0((NM^2/4)$ multiplications for the adaptive convolution of each image (wherein N×N is the image size and M×M is the filter size). Equations (2) and (3) and the model of FIG. 4, are based on actual separable bandwidth measurements obtained from the quantized DCT coefficients of rotated images using MATLAB. Note that for both directional and non-directional filtering, the pixel-adaptive nature of the IF images forces us to use spatially-adaptive convolution or equivalently, a linear combiner. In other words, the actual implementation cannot use frequency-domain filtering. Nevertheless, the analysis presented in Section entitled "Fourier Transform Analysis of the DCT Basis Functions" is useful in determining the adaptive filter's 2-D bandwidth, although the filtering operation is actually performed in the spatial domain.

Figure 6:
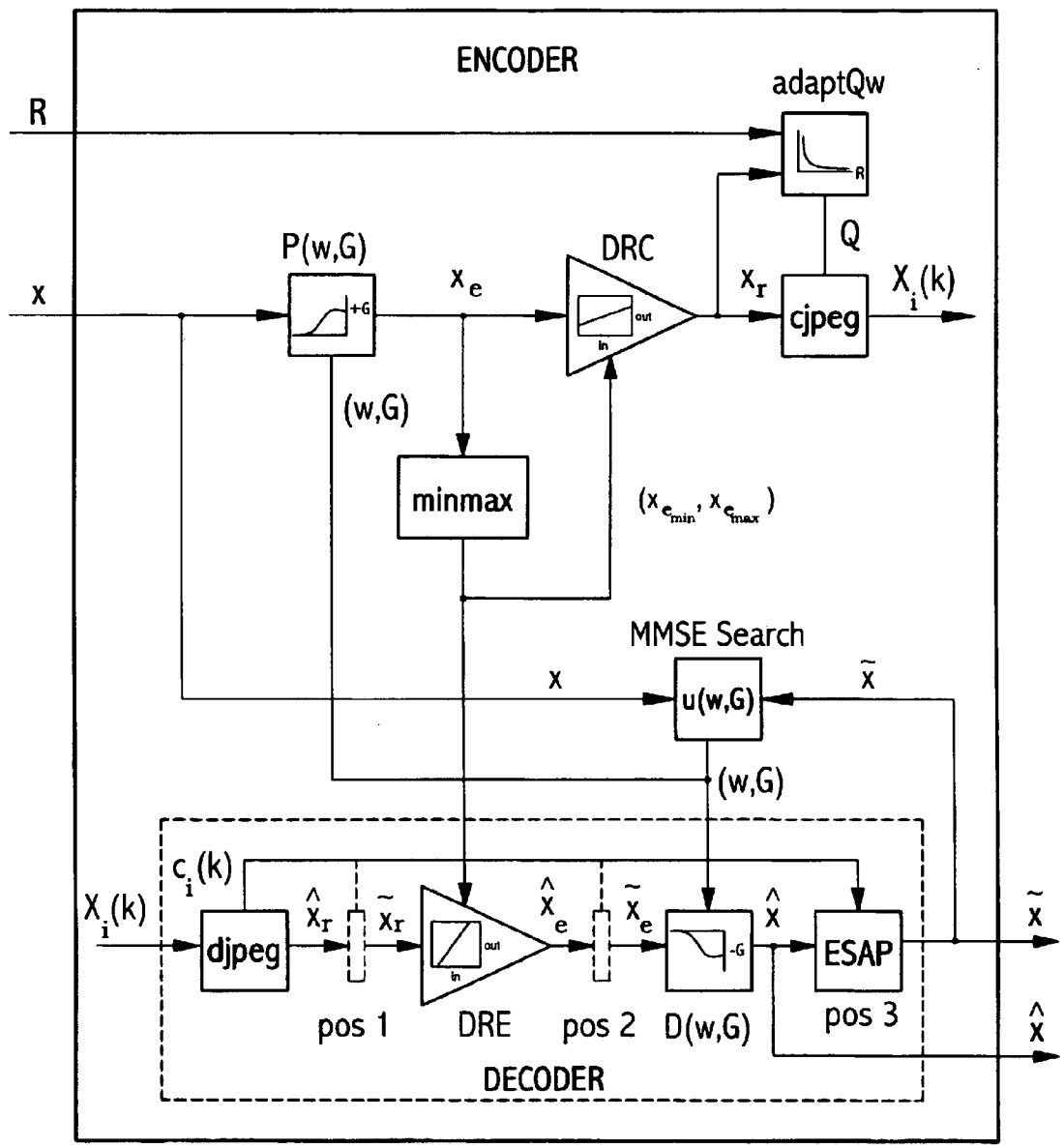
FIG. 6 shows the IPF JPEG blocking noise reduction algorithm—which is based on dbx noise reduction.

Referring to FIG. 6, original image x at the encoder is pre-emphasized with filter $P(\omega,G)$, where $\omega$ is the HPF cutoff frequency corresponding to separable DCT bandwidth $f$ of FIG. 1. Note that ($\omega \approx f$) and G is the pre-emphasis gain in dB. The dynamic range of the resulting pre-emphasized signal $x_e$ is compressed into an 8-BPP range of 0–255 using the dynamic range compression (DRC) function.

Then, the range-compressed signal $X_r$ of FIG. 7(c) is used to compute MMSE optimally quantized Q-table using the Lagrange multiplier minimization function adaptQw( ).

The image is then JPEG compressed using the standard IJG cjpeg( ) function. The 2-D pre-post filters $P(\omega,G)$ and $D(\omega,G)$ are made of separable 1-D filters, where the dB gain G applies to both dimensions, $P(\omega,G)$ is the pre-emphasis filter and $D(\omega,G)$ is the de-emphasis filter. $P(\omega,G)$ is designed to obey the pre-emphasis characteristic $$p[n] = \delta[n] + gh[n] \overset{F}{\Leftrightarrow} P(\omega) = 1 + gH(\omega).$$ Equation (7)

From Equation (7) above, the dB gain is given by $$G_{dB} = 10 \log_{10}(1+g)$$ Equation (8)

since $p[n]$ is a non-causal even-symmetric real sequence. The 2-D separable pre-post filter inverse pair is given by $$P(\omega_1,\omega_2,G)D(\omega_1,\omega_2,G)= P_1(\omega_1,G)P_2(\omega_2,G)D_1(\omega_1,G)D_2(\omega_2,G)=1.$$ Equation (9)

Finally, companding obeys the following equations. For dynamic range compression $$x_r = C(x_e - x_{emin}),$$ Equation (10)

and for dynamic range expansion $$\hat{x}_e = (1/C)\hat{x}_r + x_{emin},$$ Equation (11)

where $$C = 255/(x_{emin} - x_{emax}).$$ Equation (12)

At the decoder, JPEG file $X_r(k)$ is de-compressed into the $\hat{x}_r$ image. Then, it is dynamic range expanded (DRE) into the file $\hat{x}_e$ image. Next, the image is de-emphasized with the filter $D(\omega,G)$ to create the $\hat{x}$ image. Finally, the image is ESAP post-filtered into the ximage to obtain further block smoothing. The ESAP filter can be inserted in any of three possible positions: pos1, pos2, or pos3. Depending on which position is selected, we could create the intermediate process images $x_r$, $x_e$ or $x$.

Along with the JPEG coded image $X_r(k)$, four overhead bytes are passed to the decoder: two dynamic range compression parameters ($x_{emin}$, $x_{emax}$) and two pre-post filter parameters ($\omega$, G). This overhead only amounts to about 0.0001 BPP for a 512×512 8-BPP gray-scale image at a 32:1 compression ratio (0.25 BPP). Please note that the encoder contains an internal decoder.

Results for ESAP Enhancement of Baseline JPEG, AQ and JO Images

To compare the objective performance of several versions of the JPEG-ESAP algorithm, we use two PSNR references: JPEG and the embedded zerotree wavelet (EZW). We also show subjective improvement, including edge preservation with blocking reduction for the Lena and Barbara images.

FIG. 5(a) shows a baseline JPEG image of Lena at 0.25 BPP, 31.68 dB PSNR and FIG. 5(b) shows its corresponding adaptive quantization (AQ-ESAP) image at 33.01 dB PSNR.

Similarly, FIG. 5(c) is a baseline JPEG Barbara image at 0.5 BPP, 28.27. dB PSNR and FIG. 5(d) is its jointly optimized (JO-ESAP) version at 31.23 dB PSNR.

Tables 2(a), (b), (c), and (d) summarize the decibel (dB) PSNR comparative results.

Consider, for example, the 512×512 Lena image at 0.25 BPP. Referring to the first two lines of Tables 2(a) and (b), observe that the JPEG's cross-block smoothing (CBS) reduces the PSNR by 0.04 dB. After applying ESAP to the default quantized JPEG image we obtain a 1.08 dB improvement. When we pre-process the image to obtain an image-adaptive Q-table and post-process it with ESAP we observe post-filtering improvement as shown under $\Delta_{AQ\text{-}ESAP}$. For this case it is 1.33 dB.

TABLE 2(a)

PSNRs for 512 × 512 Lena image.

| BPP | JPEG | CBS | ESAP | AQ | AQ-ESAP | JO | JO-ESAP | EZW |
|---|---|---|---|---|---|---|---|---|
| 0.25 | 31.68 | 31.64 | 32.76 | 31.88 | 33.01 | 32.34 | 33.02 | 33.17 |
| 0.50 | 34.90 | 34.87 | 35.59 | 35.48 | 36.23 | 35.96 | 36.34 | 36.28 |
| 1.00 | 37.96 | 37.95 | 38.20 | 38.88 | 39.23 | 39.58 | 39.61 | 39.55 |

TABLE 2(b)

PSNR improvement over baseline JPEG for the 512 × 512 Lena image.

| BPP | $\Delta_{CBS}$ | $\Delta_{JPEG\text{-}ESAP}$ | $\Delta_{AQ}$ | $\Delta_{AQ\text{-}ESAP}$ | $\Delta_{JO}$ | $\Delta_{JO\text{-}ESAP}$ | $\Delta_{EZW}$ |
|---|---|---|---|---|---|---|---|
| 0.25 | −0.04 | 1.08 | 0.20 | 1.33 | 0.66 | 1.34 | 1.49 |
| 0.50 | −0.03 | 0.69 | 0.58 | 1.33 | 1.06 | 1.44 | 1.38 |
| 1.00 | −0.01 | 0.24 | 0.92 | 1.27 | 1.62 | 1.65 | 1.59 |

TABLE 2(c)

PSNRs for 512 × 512 Barbara image.

| BPP | JPEG | CBS | ESAP | AQ | AQ-ESAP | JO | JO-ESAP | EZW |
|---|---|---|---|---|---|---|---|---|
| 0.25 | 25.02 | 25.01 | 25.73 | 26.02 | 26.96 | 26.66 | 27.05 | 26.77 |
| 0.50 | 28.27 | 28.25 | 29.44 | 29.99 | 31.03 | 30.63 | 31.23 | 30.53 |
| 1.00 | 33.10 | 33.09 | 34.01 | 35.22 | 35.84 | 35.94 | 36.33 | 35.14 |

TABLE 2(d)

PSNR improvement over baseline JPEG for the 512 × 512 Barbara image.

| BPP | $\Delta_{CBS}$ | $\Delta_{JPEG-ESAP}$ | $\Delta_{AQ}$ | $\Delta_{AQ-ESAP}$ | $\Delta_{JO}$ | $\Delta_{JO-ESAP}$ | $\Delta_{EZW}$ |
|---|---|---|---|---|---|---|---|
| 0.25 | −0.01 | 0.71 | 1.00 | 1.94 | 1.64 | 2.03 | 1.75 |
| 0.50 | −0.02 | 1.17 | 1.72 | 2.76 | 2.36 | 2.96 | 2.26 |
| 1.00 | −0.01 | 0.91 | 2.12 | 2.74 | 2.84 | 3.23 | 2.04 |

TABLE 3(a)

JPEG, IPF, EZW and SPIHT comparison 512 × 512 Lena image.

| IPF Parameters $(\omega_{cq}, G_q)$ $(\chi_{emin}, \chi_{emax})$ | | Image/PSNR | | |
|---|---|---|---|---|
| BPP N, $G_r$ | JPEG | IPF | EZW | SPIHT |
| 0.25 (0.0469, 8.9609) (−94, 1106) 13, 9.25 | lena.25.jpg 31.68 | lena.25.ipf 33.15 | N/A 33.17 | lena.25.sp 34.14 |
| 0.50 (0.0312, 7.8047) (−14, 976) 13, 9.25 | lena.5.jpg 34.90 | lena.5.ipf 36.34 | N/A 36.28 | lena.5.sp 37.25 |
| 1.00 (0.0469, 8.4375) (−20, 1019) 11, 10 | lena1.0.jpg 37.96 | lena1.0.ipf 39.28 | N/A 39.55 | lena1.0.sp 40.46 |

TABLE 3(b)

IPF PSNR dB improvement for 512 × 512 Lena image.

| BPP | $\Delta_{IPF}$ | $\Delta_{EZW}$ | $\Delta_{SPIHT}$ |
|---|---|---|---|
| 0.25 | 1.47 | 1.49 | 2.46 |
| 0.50 | 1.44 | 1.38 | 2.35 |
| 1.00 | 1.32 | 1.59 | 2.50 |

TABLE 3(c)

JPEG, IPF, EZW and SPIHT comparison for 512 × 512 Barbara image.

| IPF Parameters $(\omega_{cq}, G_q)$ $(\chi_{emin}, \chi_{emax})$ | | Image/PSNR | | |
|---|---|---|---|---|
| BPP N, $G_r$ | JPEG | IPF | EZW | SPIHT |
| 0.25 (0.0469, 7.5938) (−195, 1021) 9, 9 | barb.25.jpg 25.02 | barb.25.ipf 27.23 | N/A 26.77 | barb.25.sp 27.40 |
| 0.50 (0.0312, 4.3125) (−33, 562) 7, 6 | barb.5.jpg 28.27 | barb.5.ipf 31.09 | N/A 30.53 | barb.5.sp 31.25 |
| 1.00 (0.0469, 3.5938) (−50, 451) 9, 5 | barb1.0.jpg 33.10 | barb1.0.ipf 35.87 | N/A 35.14 | barb1.0.sp 36.22 |

TABLE 3(d)

IPF PSNR dB improvement for 512 × 512 Barbara image.

| BPP | $\Delta_{IPF}$ | $\Delta_{EZW}$ | $\Delta_{SPIHT}$ |
|---|---|---|---|
| 0.25 | 2.21 | 1.75 | 2.38 |
| 0.50 | 2.82 | 2.26 | 2.98 |
| 1.00 | 2.77 | 2.04 | 3.12 |

To conclude this example, preprocessing the image to obtain a joint-optimized Q-table followed by ESAP post-processing generates an improvement $\Delta_{AO-ESAP}$ of 1.34 dB. For comparison, the last column shows the EZW $\Delta_{EZW}$ improvement. For this case it is 1.49 dB.

IPF Results

This section compares IPF with baseline JPEG, EZW, and SPIHT algorithms. Tables 3(a) and (b) show the IPF results for the 512×512 8-BPP Lena image and Tables 3(c) and (d) show the results for the 512×512 Barbara image. All the images are .gif formatted. The IPF images were obtained with the algorithm described in FIG. 6.

For comparison, the PSNR values obtained with baseline JPEG, Shapiro's embedded zerotree wavelet coder, and experimental results obtained with Said and Pearlman's set partitioning in hierarchical trees (SPIHT) subband coder are shown in the third and the two rightmost columns, respectively. The EZW PSNR values are taken from the literature and their corresponding images are not available. The values $(\omega_{cq}, G_q)$ are the quantized cutoff frequencies and gains for the pre-post filters, respectively. The expanded dynamic range is bounded by $(x_{emin}, x_{emax})$ which can normally be represented by two 12-bit signed integers. "N" is the 2-D pre-post filters' order N×N, and finally, "$G_r$" is the pre-post filters' dB gain range $(-G_r \ldots 0 \ldots G_r)$.

Alternate Embodiments

FIG. 6 shows the IPF JPEG blocking noise reduction algorithm based on the dbx noise reduction system. In this case, the MMSE search looks for four parameters: the minimum and maximum pixel amplitudes $(x_{e\,min}, x_{e\,max})$ and the $(\omega, G)$ cutoff and gain parameters, respectively.

In its simplest (sub-optimal) form, without MMSE searching, these algorithms do not require any additional overhead. These algorithms may be implemented in firmware or a fast processor capable of real-time video sequence enhancement may be used to process these algorithms to accommodate improved performance over low bit rate connections.

Variants of the disclosed ESAP system may be extended to include non-DCT coders; Including for example:

Vector Quantization (VQ);
Projection Onto Convex Sets (POCS), and;
Set Partitioning In Hierarchical Trees (SPIHT) octave-band subband coders.

The ESAP and IPF algorithms of the present invention may be implemented in firmware to obtain fast real-time response; Either one may significantly enhance the visual quality of low bit rate Internet video or MPEG video sequences.

This software has Potential applicability for video enhancement of very low rate MPEG video sequences in the range of 28.8 kbps–56 kbps generally used in popular web browser streaming video viewers such as RealPlayer or Streamworks© and for H.261 ISDN coders from Picture-Tel® and Compression Labs.

Other possible applications include use for moderate rate (4–8 Mbps) HDTV broadcasts.

What is claimed is:

1. A method for reducing image blocking artifacts resulting from high JPEG image compression comprising the steps of:
   pre-emphasizing an original image file x with a filter $P(\omega,G)$, to form a pre-emphasis signal $X_e$;
      wherein $\omega$ is the HPF cutoff frequency corresponding to the separable DCT bandwidth $f$ and where ($\omega \approx f$) and G is the pre-emphasis gain;
   compressing the dynamic range of said pre-emphasis signal $X_e$ into an 8-BPP range of 0–255 using a dynamic range compression (DRC) function to form a range-compressed signal $X_r$;
   using said range-compressed signal $X_r$ to compute a MMSE optimally quantized Q-table using a Lagrange multiplier minimization function adaptQw( );
   using parameters compiled in said Q-table;
   compressing said range-compressed signal $X_r$ image file x using the JPEG standard IJG cjpeg( ) function to form a compressed JPEG file $X_i(k)$;
   de-compressing said JPEG file $X_i(k)$ to form a de-compressed image file $\hat{x}_r$;
   expanding said de-compressed image file using dynamic range expansion (DRE) to form an image file $\hat{x}_e$;
   de-emphasizing said image file $\hat{x}_e$ using a filter $D(\omega, G)$ to create a $\hat{x}$ image;
   post-filtering said $\hat{x}$ image into an ximage, and thereafter;
   using an ESAP process to obtain further block smoothing of said x-image, wherein ESAP is Estimated Spectrum Adaptive Post-Filter.

2. The method of claim 1, wherein the ESAP process comprises the steps of:
   providing a decompressed image file;
   providing dequantized DCT coefficients;
   estimating 2-D pixel-adaptive bandwidths directly from said dequantized DCT coefficients; and
   using said dequantized DCT coefficients to control a 2-D spatially-adaptive non-linear image post-filter.

3. The method of claim 2, further comprising the step of:
   using an edge detector to control a 2-D spatially-adaptive non-linear image post-filter.

4. The method of claim 2, wherein the edge detector is Canny edge detector.

5. A method for reducing image blocking artifacts resulting from high JPEG image compression comprising the steps of:
   pre-emphasizing an original image file x with a filter $P(\omega,G)$, to form a pre-emphasis signal $X_e$;
      wherein $\omega$ is the HPF cutoff frequency corresponding to the separable DCT bandwidth $f$ and where ($\omega \approx f$) and G is the pre-emphasis gain;
   compressing the dynamic range of said pre-emphasis signal $X_e$ into an 8-EPP range of 0–255 using a dynamic range compression (DRC) function to form a range-compressed signal $X_r$;
   using said range-compressed signal $X_r$ to compute a MMSE optimally quantized Q-table using a Lagrange multiplier minimization function adaptQw( );
   using parameters compiled in said Q-table;
   compressing said range-compressed signal $X_r$ image file x using the JPEG standard IJG cjpeg( ) function to form a compressed JPEG file $X_i(k)$;
   de-compressing said JPEG file $X_i(k)$ to form a de-compressed image tile $\hat{x}_r$;
   expanding said de-compressed image file using dynamic range expansion (DRE) to form an image file $\hat{x}_e$;
   de-emphasizing said image file $\hat{x}_e$ using a filter $D(\omega, G)$ to create a $\hat{x}$ image; and
   using an Estimated Spectrum Adaptive Postfilter algorithm to post-filter said $\hat{x}$ image into an ximage.

6. The method of claim 5, wherein the ESAP algorithm comprises the steps of:
   providing a decompressed image file;
   providing dequantized DCT coefficients;
   estimating 2-D pixel-adaptive bandwidths directly from said dequantized DCT coefficients; and
   using said dequantized DCT coefficients to control a 2-D spatially-adaptive non-linear image post-filter.

7. The method of claim 6, further comprising the step of:
   using an edge detector to control a 2-D spatially-adaptive non-linear image post-filter.

8. The method of claim 7, wherein the edge detector is Canny edge detector.

9. The method of claim 5, further comprising the step of:
   using an Estimated Spectrum Adaptive Postfilter algorithm to post-filter said $\hat{x}_r$ image into an $x_r$ image.

10. The method of claim 5, further comprising the step of:
    using an Estimated Spectrum Adaptive Postfilter algorithm to post-filter said $\hat{x}_e$ image into an $x_e$ image.

* * * * *